United States Patent [19]

Navarro

[11] Patent Number: 4,687,312
[45] Date of Patent: Aug. 18, 1987

[54] MATTE BOX ASSEMBLY

[75] Inventor: Felipe Navarro, Granada Hills, Calif.

[73] Assignee: Panavision, Inc., Tarzana, Calif.

[21] Appl. No.: 625,012

[22] Filed: Jun. 27, 1984

[51] Int. Cl.⁴ .............................................. G03B 11/00
[52] U.S. Cl. .................................... 354/295; 251/287
[58] Field of Search ................ 355/75; 354/122, 245, 354/296, 286, 89, 287, 354, 188; 352/34, 85, 243; 248/178

[56] References Cited

U.S. PATENT DOCUMENTS

| | | | |
|---|---|---|---|
| 1,468,091 | 9/1923 | Thalhammer | 354/296 |
| 1,624,096 | 4/1927 | Garbutt | 352/243 |
| 3,589,260 | 6/1971 | Ferra | 354/293 |
| 3,604,328 | 9/1971 | Nakagawa | 355/75 |
| 4,327,984 | 5/1982 | Evans | 354/295 X |

FOREIGN PATENT DOCUMENTS 2026967 12/1971 Fed. Rep. of Germany ...... 354/288
2074330 10/1981 United Kingdom ................ 354/295

*Primary Examiner*—L. T. Hix
*Assistant Examiner*—Brian W. Brown
*Attorney, Agent, or Firm*—Lyon & Lyon

[57] ABSTRACT

A matte box assembly for a movie camera wherein a front frame is slidably and pivotally supported from iris rods extending from the camera parallel to the lens. A plurality of filter holder modules are provided with mating dovetail slots on their front and rear vertical surfaces for allowing quick assembly and disassembly of any number and type of filter holder modules to each other and to the frame. A light shield module is similarly assembled to the filter holder modules by dovetail slots and fits over the lens in the camera-ready position of the matte box assembly. Locking mechanisms releasably attach each module to the next adjacent module for maintaining alignment and position. One or more of the modules may have a rotatable construction for rotating the front relative to the back.

23 Claims, 14 Drawing Figures

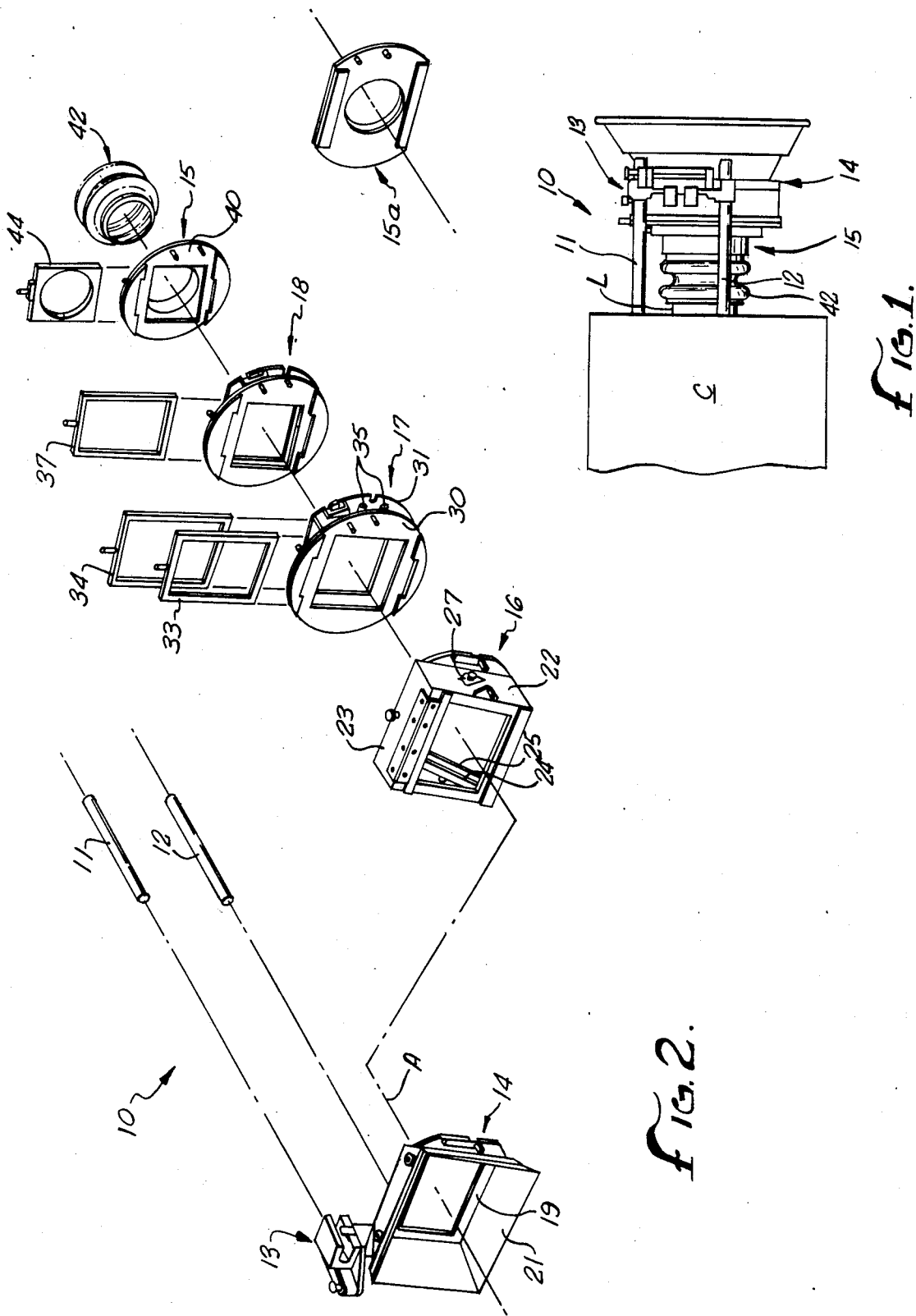

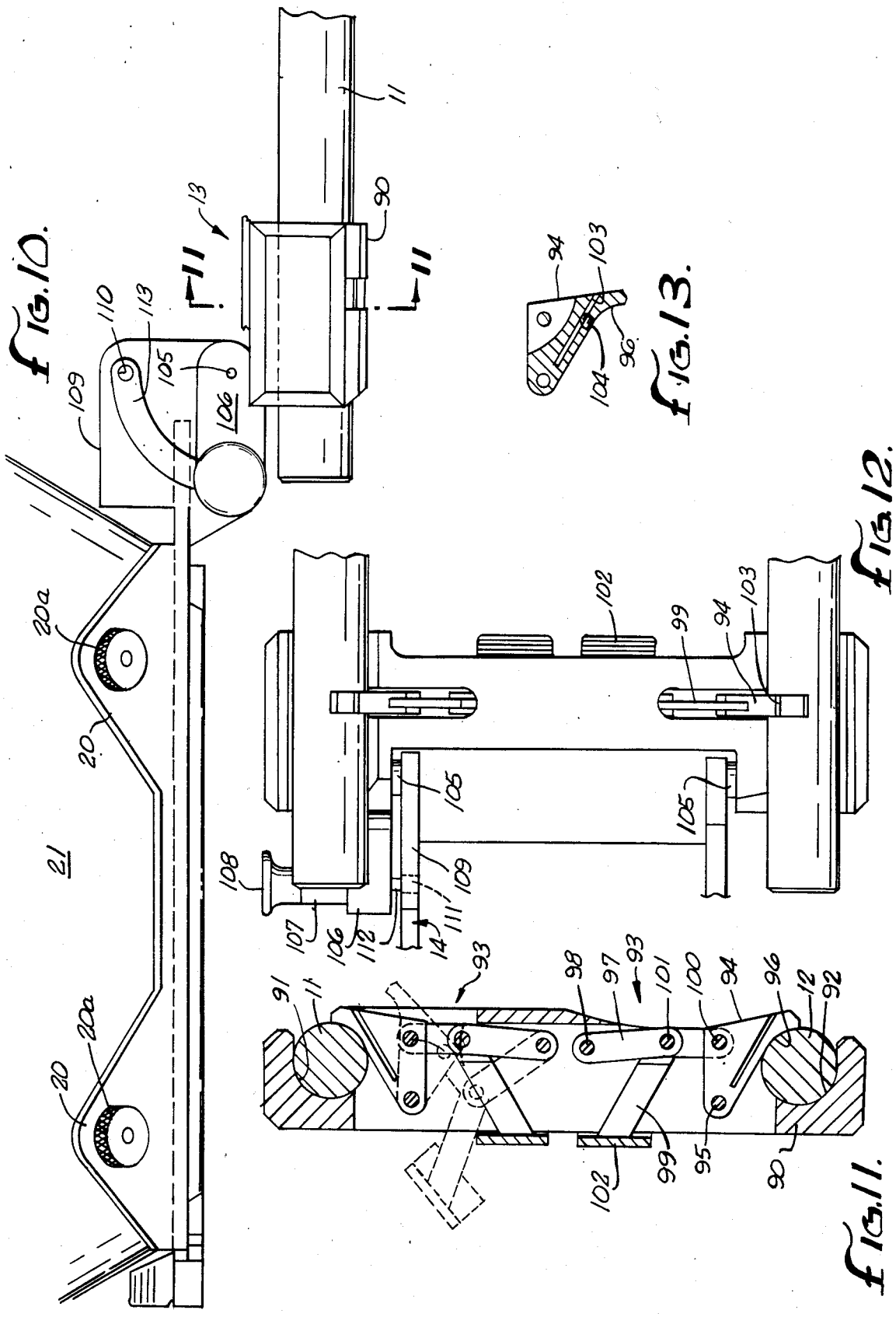

4,687,312

MATTE BOX ASSEMBLY

This invention relates to a matte box assembly for use on cameras and, in particular, for use on professional motion picture cameras requiring a variety of different filters to achieve the high quality of motion picture filming desired.

It is a well known practice in the professional motion picture industry to employ several different types of filters in a so-called matte box in front of the camera lens to produce the high quality of picture or special coloring effects desired for theatre viewing of motion pictures. The filters may be of several different types including various color filters and light polarizing filters. For optimum results some filters require tilting relative to the lens axis and other filters require rotation about the lens axis. Thus, a conventional matte box for a high quality motion picture camera normally includes an assembly of several different filter holders having different capabilities such as tilting, rotation or number of filters and such filter holders are assembled one to another by a plurality of screws. Since the filming of a scene or different scenes requires changes in filters and even the filter holders to provide different capabilities, the previously conventional matte box assemblies required substantial time and effort to make any significant changes in the filter holders by removing and replacing the plurality of screws in disassembling and assembling the filter holders. During the filming of a professional movie production, the cost per minute is enormous due to the cost of personnel and equipment and therefore any delay in making changes in the matte box for using different filters can be extremely expensive.

Therefore, it is an object of this invention to provide a matte box for a movie camera wherein a plurality of different filter holders may be rapidly and easily assembled and disassembled to create the desired filter characteristics and capabilities.

It is a further object of this invention to provide a movie camera matte box assembly comprised of a plurality of filter holding modules that may be assembled in interchangeable relationship by interengaging elements on each module. A still further object of this invention is to provide such a matte box assembly wherein a support frame is pivotally supported from the camera and the lens holding modules are adapted to be quickly mounted on the frame in front of the lens without support from the lens. A further detailed object of this invention is to provide such a support frame that is pivotally and movably mounted relative to the camera for convenience in assembling and disassembling filter holder modules.

Other and more detailed objects and advantages of this invention will appear to those skilled in the art from the following description and the accompanying drawings, wherein:

FIG. 1 is a side elevation of the matte box assembly of this invention mounted in position on a diagrammatically illustrated movie camera.

FIG. 2. is an exploded perspective view of the components forming the matte box assembly of this invention with several different types of filter holder modules.

FIG. 10 is an enlarged top plan view of a portion of the matte box assembly of this invention illustrating the supporting and pivoting mechanism.

FIG. 11 is a sectional elevation view of the matte box supporting mechanism taken substantially on the Line 11—11 in FIG. 10.

FIG. 12 is a side elevation view of the matte box supporting and pivoting mechanism illustrated in FIG. 10.

FIG. 13 is a sectional elevation view of the adjustable portion of the matte box support mechanism linkage illustrated in FIG. 11.

Figure 3:
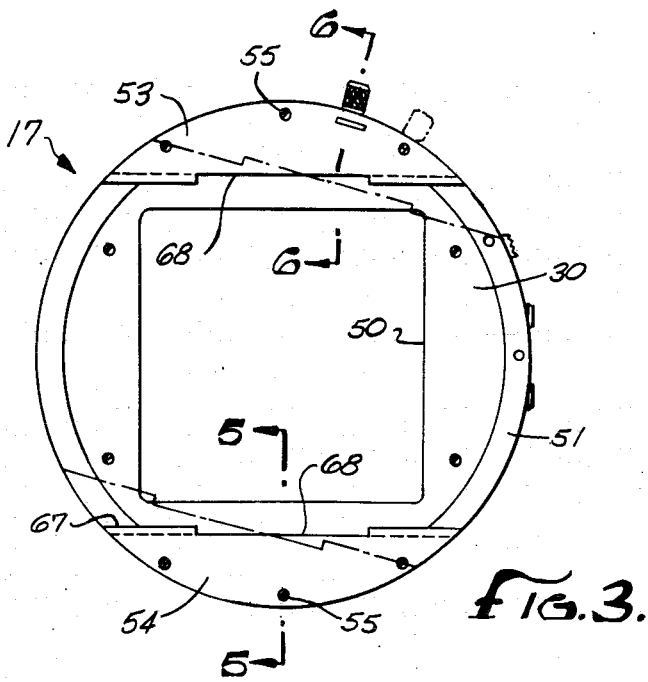
FIG. 3 is a front elevation of a typical filter holder module of this invention and specifically a module which allows rotation of the filter about the axis of the camera lens.
Figure 5:
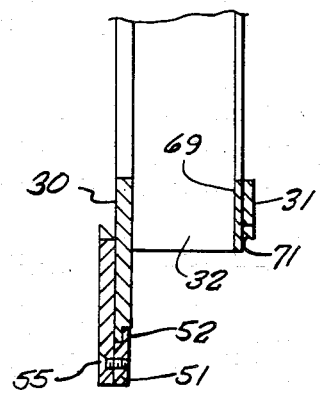
FIG. 5 is a sectional elevation of a portion of the filter holder module of FIGS. 3 and 4 taken substantially on the Line 5—5 in FIG. 3.
Figure 4:
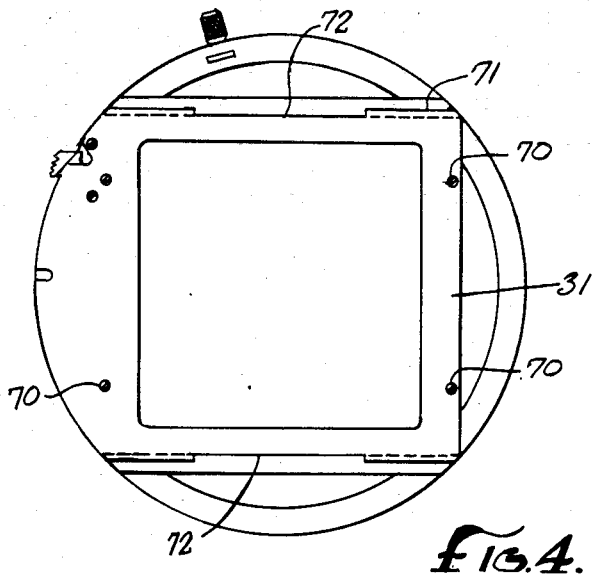
FIG. 4 is a rear elevation view of the filter holder module of FIG. 3.
Figure 6:
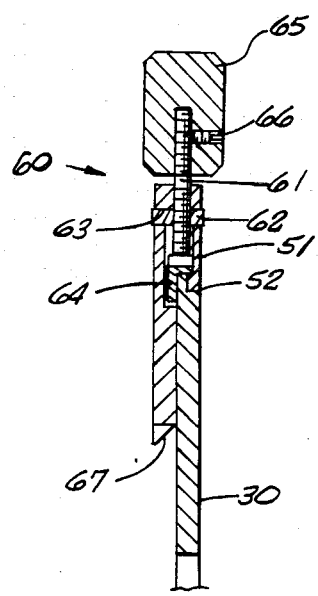
FIG. 6 is a sectional side view of a portion of the filter holder module of FIGS. 3 and 4 taken substantially on the Line 6—6 in FIG. 3.

Referring now to FIG. 1, the matte box assembly of this invention is shown mounted on a diagrammatically illustrated movie camera C having a forwardly extending lens L and it will readily appear to those skilled in the art that this invention is applicable to any form of camera and lens that may require a matte box with the capabilities of the present invention. The matte box assembly, generally designated 10, of this invention includes a pair of vertically spaced iris rods 11 and 12 mounted on the camera C to extend forwardly of the camera parallel to the axis A of the lens but spaced to one side of the lens L. The remaining components of the matte box assembly 10 are movably and pivotally supported on the iris rods 11 and 12 by a support mechanism, generally designated 13, which will be described later in connection with FIGS. 10 through 13. The support mechanism 13 permits the matte box assembly to be moved toward and away from the camera C parallel to the axis of the lens L to accommodate different thicknesses of the matte box assembly due to using different types and numbers of filter holder modules. Further, the support mechanism 13 permits the matte box assembly to be pivoted on a vertical axis away from the front of the lens L for assembling and disassembling filter holder modules, as desired, without removing the matte box assembly 10 from the camera C.

Figure 7:
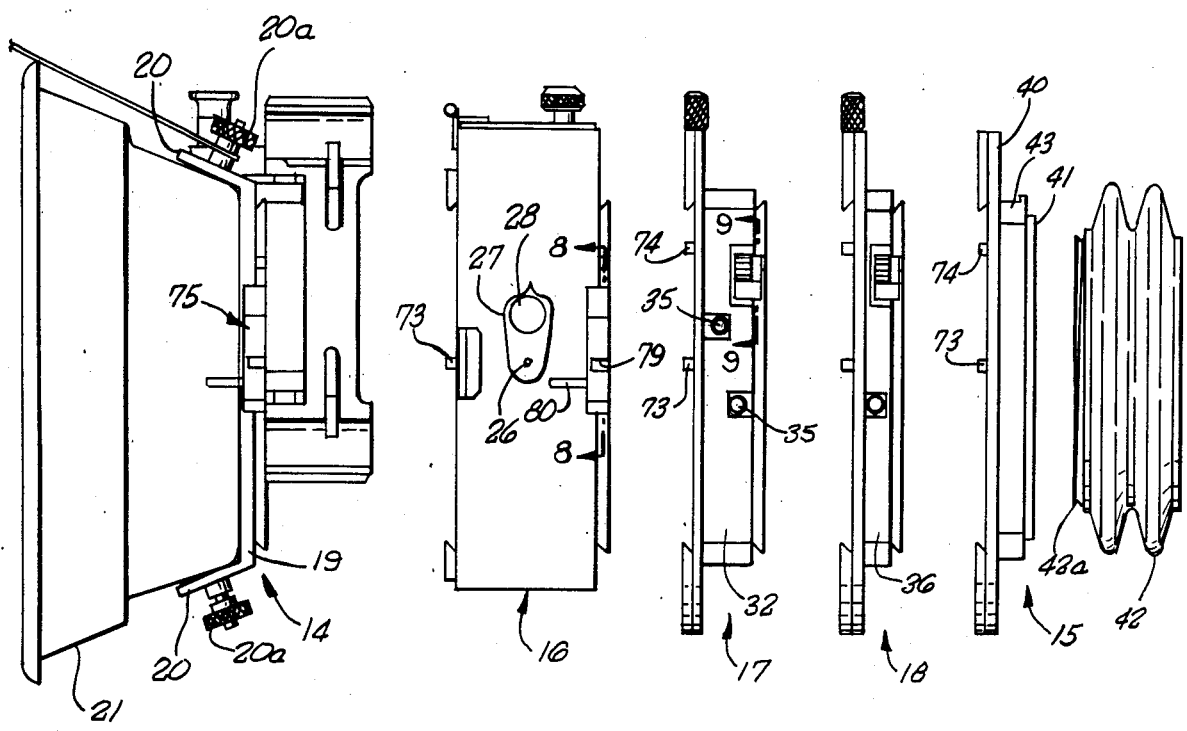
FIG. 7 is an exploded side elevation view of the typical components comprising the matte box assembly of this invention.
Figure 14:
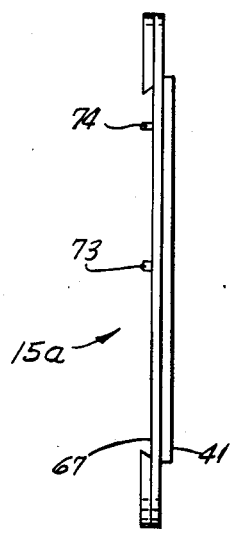
FIG. 14 is a side elevation view of a modified form of the light shield module of this invention.

The matte box assembly 10 of this invention is comprised of a frame module, generally designated 14, pivotally supported by the mechanism 13 at the front of the matte box assembly 10 and a light shield module, generally designated 15, at the rear end near the lens L together with any desired number of filter holder modules mounted therebetween. FIG. 14 illustrates a modified form of light shield module 15a. In FIGS. 2 and 7, three different filter holder modules, generally designated 16, 17 and 18, are illustrated by way of examples but it will readily appear to those skilled in the art that other forms of filter holder modules may be used and more than one of the shown filter holder modules may be used in a given matte box assembly for producing the desired result. As shown in the drawings, module 16 is a tiltable two filter holding module, module 17 is a two filter rotatable module, and module 18 is a single filter rotatable module. The two filter rotatable module 17 is shown in further detail in FIGS. 3–6 for illustrating the details of the construction of the interengaging means for assembling one module to another and the means for rotating one module about the axis of the lens. Before turning to a detailed description of the components and functions of these interconnecting means and rotating means, the features and construction of the frame, light shield and filter modules will be described in general.

The frame module 14 includes an open rectangular frame portion 19 and brackets 20 upon which can be mounted a sun shade 21 projecting forwardly. Brackets 20 also carry thumb screws 20a which may be used to releasably mount other conventional attachments above or below the sun shade such as a sun shade extention 21a or a french flag device for providing shading against a particular light source.

The tilting two filter module 16 has a box frame 22 with a hinged lid 23 for access to the interior of the box frame 22. A pair of filter holders 24 and 25 are adapted to receive one or two filters, as desired, and are mounted on the frame 22 to pivot about a lateral horizontal axis 26. An adjustment arm 27 is connected to the pivot shaft of the frames 24 and 25 and carries a thumb screw 28 which may be released to pivot the filters the desired amount and tightened to engage the outer surface of box frame 22 to lock the frames in the desired angular position. The desired filters may be installed and removed in the holders 24 and 25 by opening the lid 23.

The two filter rotatable module 17 has a circular front plate 30 and a rear plate 31 connected by vertical side plates 32 to form a housing for a pair of filter frames 33 and 34 which may be held in position within the housing by any convenient means, such as frictional leaf springs (not shown) and/or set screws 35 threadedly mounted in a side plate 32. In this manner one or two filters of any desired characteristic may be mounted in module 17.

The single filter holder module 18 may be substantially the same as the two filter modules 17 except with longitudinally shorter side plates 36 than the comparable side plates 32 for accommodating a single filter frame 37. Module 18 may be rotatable about the axis A of the lens in the same manner as hereinafter described with respect to module 17.

The light shield module 15 is comprised of a front face plate 40 and a rear cylindrical portion 41 that has an internal thread. A flexible cylindrical boot member 42 has an external thread 42a for threadly engaging the cylindrical portion 41 to mount the boot, on thereon for extending rearwardly over the exterior of the lens L for preventing the intrusion of any light between the rear end of the matte box assembly 10 and the lens L. In addition, light shield module 15 may include a box frame 43 for receiving a filter 44 and the face plate 40 may be rotatably supported relative to the cylindrical housing 41 in a manner similar to that described hereinafter with respect to module 17.

A modified form of a light shield module 15a is shown in FIGS. 1 and 14 which module does not include a box frame for receiving a filter. Module 15a does include an identical rear cylindrical portion 41 with an internal thread for mounting the boot 42 thereon.

Referring now to FIGS. 3 through 6, the rotatable two filter module 17 is shown in greater detail. The circular front plate 30 has a rectangular opening 50 therethrough and a circular ring 51 surrounding same. The plate 30 and ring 51 have offset flanges at their mating juncture 52 to support the ring 51 on the back of the face plate 30. Upper and lower circle segments 53 and 54, respectively, are connected by a plurality of countersunk screws 55 to the circular ring 51 in front of face plate 30 to capture the radial flange on face plate 30 between the radial flange on ring 51 and the segments 53 and 54 to thereby rotatably connect the face plate 30 to the assembled ring 51 and segments 53, 54. A locking mechanism, generally designated 60, is provided for releasably locking the ring 51 and segments 53 and 54 to the face plate 30. The locking mechanism 60 includes a threaded screw 61 threadedly engaging a tab 62 captured in a slot 63 in ring 51 and segment 53. The head of screw 61 engages a friction shoe 64 that fits the outer periphery of circular face plate 30. A knob 65 threadedly engages the upper end of screw 61 and is locked thereto by a set screw 66 for turning the screw 61. By rotating knob 65 to release the friction shoe 64 the ring 51 and segments 53, 54 may be rotated relative to the face plate 30 to the desired position (such as shown by phantom lines in FIG. 3) and locked by rotating the knob 65 to impose force on the shoe 64 through screw 61. By this structural arrangement, a very thin and lightweight rotatable support is provided that may be locked in any desired angular position thereby minimizing the thickness and weight of the matte box assembly 10.

FIGS. 3 through 6 also illustrate the preferred quick-disconnect means for joining the frame 14, modules 16, 17 and 18, and the light shield 15 or modified light shield 15a. The aforedescribed circle segments 53 and 54 are provided with facing dovetail slots 67 in the form of their facing horizontal edges being chamfered at approximately 45°. The central portions of each segment 33 and 34 are relieved at 68 to eliminate the dovetail slots 67 for ease of assembly, as hereinafter described. The rear face plate 31 is mounted on a rectangular frame 69 by a plurality of countersunk screws 70. The upper and lower edges of face plate 31 are provided with a dovetail slots 71 and the central portions 72 are removed the same as central portions 68. Dovetail slots 67 are provided on the front vertical surface of the light shield module 15, modified light shield module 15a, and each filter holder module 16, 17 and 18 and dovetail slots 71 are provided on the rear vertical surface of the frame 14 and modules 16, 17 and 18. The dovetail slots 67 and 71 are of a mating size such that each module may be quickly assembled to the adjacent module by positioning the modules in a laterally offset relationship and moving the modules together whereby the dovetails 67 on the front face of one module pass through the central openings 72 on the rear face of the other module and the front and rear faces of the modules are brought into full surface contact. One module is then laterally moved relative to the other module to engage the respective dovetails slots 67 and 71 when the modules are axially aligned. If desired for structural strength or any other reason, the dovetails 67 and 71 may be continuous, i.e. without open central portions 68 and 72 such as shown for modified light shield module 15a in FIG. 1, whereupon the modules are engaged solely by lateral movement.

Figure 8:
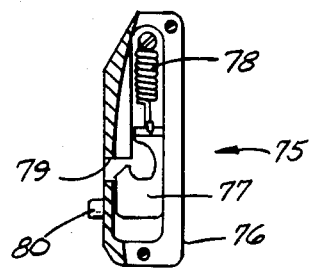
FIG. 8 is a sectional elevation view taken substantially on the Line 8—8 in FIG. 7 and illustrates a locking device for maintaining the matte box components in assembled relationship.
Figure 9:
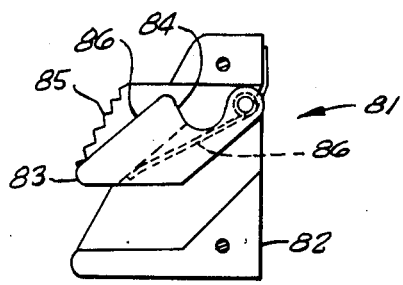
FIG. 9 is a sectional elevation view taken substantially on the Line 9—9 in FIG. 7 and illustrates an alternate form of the locking mechanism shown in FIG. 8.

It is preferred that means be provided for locking the interengagement of the dovetails between two modules in an axially aligned position and those means may be in the form of the locking devices illustrated in FIGS. 8 and 9. The light shield modules 15 and 15a and each of the filter holder modules 16, 17 and 18 are provided with either one forwardly extending pin 73 on its front face or a pair of pins 73 and 74 at different elevations on the front face for engaging the locking mechanisms of FIGS. 8 and 9. Due to the particular configuration of the frame or module, it may be advantageous to use one or the other of the locking mechanisms shown in FIGS. 8 and 9. The mechanism 75 of FIG. 8 comprises a small housing 76 in which is slidably mounted a hook member 77 biased upwardly by a tension spring 78. As one module is assembled to another module by lateral engagement of the dovetails a pin 73 passes through an outwardly facing slot 79 in housing 76 and engages the hook member 77 to depress it downwardly until the pin 73 is in the correct position whereupon it is latched there by hook member 77. A lever 80 is connected to hook member 77 (on the opposite side from that shown in FIG. 8) for depressing the hook member 77 to release it from the pin 73 for laterally sliding one module relative to another for disassembling the modules.

The second type of locking mechanism, generally designated 81, as shown in FIG. 9 includes a housing 82 in which a lever 83 is pivotally mounted. Lever 83 has a hook portion 84 and a thumb engaging portion 85. A torsion spring 86 is positioned in a slot in lever 83 and biases the lever clockwise, as viewed in FIG. 9, to the latching position. A pin 74 on one module is adapted to engage the inclined surface 86 of lever 83 to rotate the lever in a counterclockwise direction and then the pin 74 is engaged in the hook portion 84 of the lever to lock the two adjacent modules in the desired axially aligned position. By depressing the lever 83 the hook portion 84 releases the pin 74 and the modules may be moved laterally to disengage the dovetails. In this manner two or more of the modules 14 through 18 or similarly constructed modules may be quickly and easily connected one to another to form a matte box having the desired filter capabilities and yet axial alignment of the components and exclusion of stray light is assured by the surface to surface dovetail type connection with locks hereinabove described.

For readily assembling the filter modules on the camera and accommodating any desired number of filter modules producing a different axial length, there is provided a pivotable and movable support mechanism 13 shown in detail in FIGS. 10 through 13. The mechanism 13 includes a machined housing 90 having circular machined surfaces 91 and 92 for laterally engaging the iris rods 11 and 12, respectively. A pair of toggle link mechanisms 93 are provided in the housing 90 for releasably connecting the housing to the rods 11 and 12 and since the mechanisms are identical only one will be described. A clamp 94 is pivotally mounted by pin 95 in housing 90 and has a curved surface 96 for engaging an iris rod. A link 97 is pivotally mounted by pin 98. A lever 99 has the extending end connected by pin 100 to clamp 94 and an intermediate portion connected by pin 101 to link 97. The lever 99 has a finger grip portion 102 for manually moving the lever between the locked position shown in solid lines in FIG. 11 and the released position shown in dashed lines in FIG. 11. This over-center type toggle arrangement assures that substantial clamping force is applied by the clamp 94 to the iris rods 11 or 12 against the curved surface 91 or 92, respectively, of the housing 90 to firmly lock and support the mechanism 31 on the iris rods 11 and 12. In order to provide an adjustment of the clamping engagement of the toggle mechanism 93, a slot 103 is provided in clamp 94 between the location of pin 100 and clamping surface 96 and a screw 104 threadedly engages the extending arm portion having the surface 96. By adjusting the screw 104 the distance between curved surface 96 and pin 100 may be varied to in turn adjust the clamping force.

The support mechanism 13 is pivotally connected to the frame module 14 by a pair of vertically aligned pivot pins 105 to pivot about a vertical axis. A projecting arm portion 106 on mechanism 13 has a boss 107 slidably supporting a release pin 108 which is biased by a spring (not shown) positioned within boss 107 to urge the release pin 108 downwardly. The frame module 14 has a horizontal boss 109 immediately below arm 106 with holes 110 and 111 therein spaced at approximately 90 from each other relative to the axis of pivot pins 105 and adapted to be engaged by a projection 112 at the lower end of release pin 108. In this manner the frame module 14 may be pivoted between a position perpendicularly aligned with the axis A of the lens L and a second position to one side of the lens L as shown in FIG. 10. This second position permits easy access to the filter holder modules 16, 17 and 18 for removal, replacement and assembly. If the material of frame module 14 is relatively soft, a hard insert 113 may be attached to the boss 109 to avoid damage by the extension 112 of the release pin 108 while pivoting the frame between the two positions.

Thus, it may be seen that by this invention there is provided a matte box assembly which may be quickly and easily assembled and disassembled from mating modules to provide any desired combination of filter supporting housings, all of which are supported from a frame that quickly and easily pivots between positions for camera use or filter module removal and replacement thereby minimizing the time and effort in creating and changing the desired matte box assembly. While a specific embodiment of this invention has been described in detail, it will readily appear to those skilled in the art that various modifications and alternate embodiments are within the scope of this invention as set forth in the accompanying claims.

The invention claimed is:

1. A matte box assembly for a camera having a lens, comprising, a frame means for connecting to and supported from the camera separate from the lens and extending forwardly of the lens, a light shield means for engaging the camera lens, a plurality of interchangeable filter means selectively positioned between said frame means and said light shield means, said filter means having means for removably receiving a filter, and said frame means, light shield means and each filter means each having mating quick disconnect means thereon for selectively connecting the light shield means and filter means to and supporting same from said frame means, said quick-disconnect means comprising means for allowing rapid and selective lateral removal and replacement of each said filter means without rotation and without removing the frame means.

2. A matte box assembly for a camera having a lens and separate support means for the matte box assembly, comprising, a frame module means having means for connecting to the camera support means to support the frame means in front of and spaced from the lens, a light shield module means for engaging the camera lens, a plurality of interchangeable filter supporting module means selectively positioned between said frame module means and said light shield module means, said filter supporting module means having means for removably receiving a filter, and said module means each having mating quick-disconnect means thereon for connecting the light shield module means and filter supporting module means to said frame module means and supporting them from said frame module means, said quick-disconnect means comprising means for allowing rapid and selective lateral removal and replacement of each said filter supporting module means without rotation and without removing the frame module means.

3. The matte box of claim 2 wherein said mating quick-disconnect means comprise dovetail means on the front and back of each filter supporting module means, on the back of said frame module means, and on the front of said light shield module means.

4. The matte box of claim 3 wherein the said dove-tail means on the front of each said module means is the same shape and the said dovetail means on the back of each said module means is the same shape.

5. The matte box of claim 4 wherein the said front and back dovetail shapes are reversed from each other although mating, and a central portion of each dovetail means is removed for axial engagement between module means before lateral movement to interengage said dovetail means.

6. The matte box of claim 2 wherein locking means are provided for releasably locking said quick-disconnect means.

7. The matte box of claim 3 wherein locking means are provided for releasably locking said quick-disconnect means.

8. The matte box of claim 7 wherein said locking means includes a pin extending outwardly from either all of the fronts or backs of each module means having a dovetail means and a hook means mounted on the other of said fronts or backs of each module means having a dovetail means to releasably engage a said pin on an adjacent module means.

9. The matte box of claim 8 wherein at least one of said hook means includes a hook member biased toward a locking position and means connected to said hook member for manual engagement to move the hook member to an unlocked position.

10. The matte box of claim 9 wherein said hook member is slidably mounted.

11. The matte box of claim 9 wherein said hook member is pivotally mounted.

12. The matte box of claim 2 wherein said means for connecting to the camera support means includes means for adjusting the distance between the frame module means and the lens.

13. The matte box of claim 12 wherein said means for connecting to the camera support means includes means for pivoting said frame module means about a vertical axis for assembling and disassembling said light shield module means and filter supporting module means on and off said frame module means.

14. The matte box of claim 2 wherein said means for connecting to the camera support means includes means for pivoting said frame module means about a vertical axis for assembling and disassembling said light shield module means and filter supporting module means on and off said frame module means.

15. The matte box of claim 2 wherein at least one of said module means includes means for rotating the front relative to the back on the axis of the lens.

16. The matte box of claim 15 wherein said rotating means is comprised a circular plate encircled by a ring with mating flanges on said plate and ring preventing axial separation thereof in one axial direction, and a plate means connected to either said circular plate or said ring and overlying the other to prevent axial separation in the other direction.

17. The matte box of claim 16 wherein said circular plate and ring are of the same axial thickness.

18. The matte box of claim 16 wherein said plate means is connected to said ring and has a chamfered edge for forming a dovetail slot in cooperation with said circular plate to comprise a portion of said quick-disconnect means.

19. The matte box of claim 16 wherein means are provided for releasably locking said circular plate and ring together in any selected angular position.

20. A matte box assembly for a camera having a lens and separate support means for the matte box assembly, comprising, a frame means having means for connecting to the camera support means to support the frame means in front of and spaced from the lens, said frame means having a vertical back surface facing the camera, a light shield means for engaging the camera lens and having a vertical front surface facing said frame means, a plurality of interchangeable filter supporting means selectively positioned between said frame means and said light shield means, said filter supporting means having means for removably receiving a filter, each said filter supporting means having front and back vertical surfaces, and said frame means, light shield means and each said filter supporting means each having mating quick-disconnect means on said vertical surfaces thereof for selectively connecting the light shield means and filter supporting means to said frame means and supporting them from said frame means, said quick-disconnect means comprising means for allowing rapid and selective lateral removal and replacement of each filter supporting means without rotation and without removing the frame means.

21. The matte box of claim 20 wherein said quick-disconnect means include a female dovetail means on each said front surface and a mating male dovetail means on each said back surface.

22. The matte box of claim 21 wherein said dovetail means extend horizontally.

23. A matte box assembly for a camera having a lens, comprising,
 a pair of rods for mounting on and extending forwardly of the camera on one side of the lens,
 a housing having locking means for releasably mounting on said rods,
 a frame pivotally mounted on said housing to pivot about a vertical axis,
 said frame having a vertical back surface that moves between a first position perpendicular to the lens axis and facing the camera and a second position angularly displaced a substantial amount,
 said frame vertical back surface having a horizontal dovetail means thereon, at least one filter module with each such module having vertical front and back surfaces with a dovetail means on the back surface the same as said dovetail means on said frame back surface and a dovetail means on the front surface for mating with said frame back surface dovetail means to support one said filter module from said frame and to support any additional filter modules from each other by interengagement of said dovetail means, each said filter module having means for removably supporting a light filter for a selective combination of one or more desired filters, a light shield module having a front vertical surface with dovetail means thereon for engagement with and being supported from the dovetail means on the back surface of a filter module, means on each pair of mating dovetail means for locking same in an assembled position, and said light shield means having flexible boot means for surrounding and engaging the camera lens when said frame is in said first position.

* * * * *